March 8, 1960     H. E. JOHNSON     2,927,604
CHECK VALVE HAVING CLOSED INTERNAL CIRCUIT HYDRAULIC SYSTEM
Filed Oct. 9, 1956
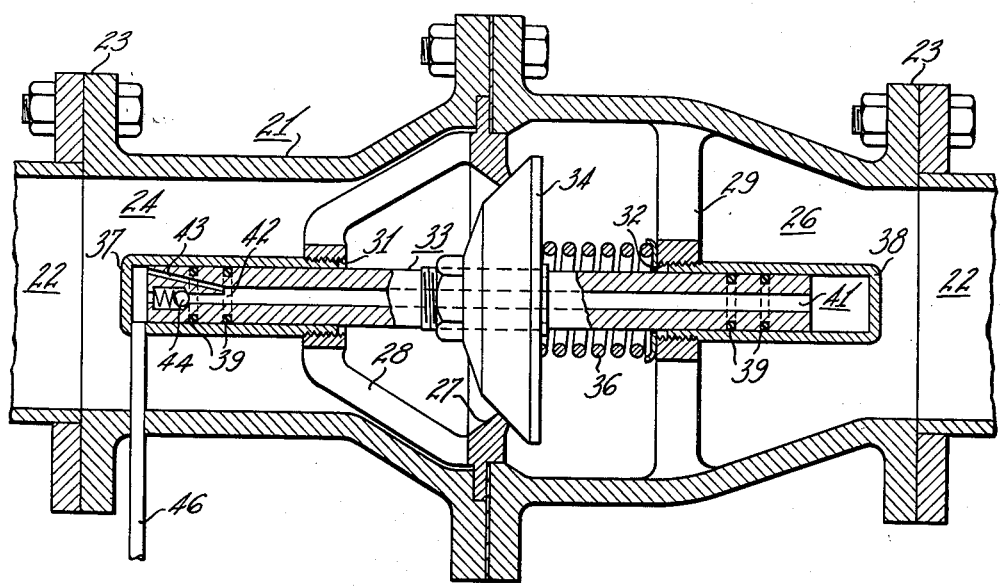
Inventor
Harold E. Johnson
By Joseph E. Kerwin
Attorney

United States Patent Office 2,927,604
Patented Mar. 8, 1960

2,927,604

CHECK VALVE HAVING CLOSED INTERNAL CIRCUIT HYDRAULIC SYSTEM

Harold E. Johnson, West Allis, Wis., assignor to Allis-Chalmers Manufacturing Company, Milwaukee, Wis.

Application October 9, 1956, Serial No. 614,941

3 Claims. (Cl. 137—514.5)

This invention relates to improvements in valves for controlling the distribution of a fluid and more particularly to self-closing check valves to prevent reversal of the flow in a fluid distribution line.

A valve of this type is more fully described and claimed in copending application, Serial Number 614,942, filed October 9, 1956, and of which the subject matter of this application constitutes in many respects an improvement.

In general, a check valve is used on compressors, or pumps, or blowers to prevent flow of fluid back through the machine upon occurrence of any conditions, under which the output pressure of the machine becomes less than that of the connected distribution line.

Such reversal of flow in machines of the type mentioned above must be positively prevented to avoid damage or even destruction of the machine due to excessive speed.

A check valve must therefore be positively self-closing when the machine delivery pressure drops below the distribution line pressure.

The check valve itself, to be suitable for this type of service, should be constructed so as to operate freely, automatically, without chatter, slamming or hammering, must have a long life, be trouble free and require little or no maintenance.

The main objects of this invention are to provide an improved construction and arrangement of the shock absorptive means that is combined with the valve disk or element in a pressure conduit so as to eliminate chatter, slamming, or hammering, and so as to cause positive sealing in closing.

Another object of the invention is to provide an improved check valve in which the disk or element is opened and closed at differentially controlled rates of movement.

Still another object of the invention is to provide an improved check valve so constructed that the shock absorptive means damping the valve disk or element is internal with respect to the valve body allowing a comparatively clearer passageway to the fluid in the pressure conduit.

Objects and advantages other than those above set forth will be apparent from the following description when read in connection with the accompanying drawing. The single figure is a horizontal cross sectional view of a check valve embodying the present invention, the view being taken on a central plane on the axis of the check valve and showing the valve disk in the closed position.

Referring more particularly to the drawing there is shown a main check valve with valve body 21 connected into a pressure conduit or distribution line 22 through the flanged ports 23, one being the inlet passage 24, the other being the outlet passage 26. The valve body has a valve seat 27 positioned within the valve body, and the valve seat having attached a web flanged support 28 containing a central bore 31 which is axially aligned within and with the valve body on the inlet side of the valve seat.

On the other side of the valve seat is an internal web flange support 29, which also contains a central bore 32 axially aligned within and with the valve body. The internal web flange support is positioned between the valve seat and the outlet passage.

Intermediate and extending through the above mentioned bores is a valve shaft 33 positioned so that it has freedom to reciprocate. Connected to the valve shaft is a pressure responsive valve disk or element 34 that is positioned intermediate the valve seat and internal web flange support. Interposed between the internal web flange support and the valve disk is biasing means such as a coil spring 36 which tends to hold the valve disk on the valve seat.

Two equal area hydraulic cylinders 37 and 38 are on opposite ends of the valve shaft. The hydraulic cylinders are affixed to the respective web flange supports as indicated in the drawing so that the open ends of the cylinders are opposite each other, allowing the valve shaft extremities to be within these cylinders.

It is to be noted that the combination of the flange supports, valve shaft, and hydraulic cylinders are aligned along the axis of the valve body.

Suitable sealing means are provided to prevent leakage between the valve shaft and the hydraulic cylinders and are shown as O rings 39 carried on the shaft. Thus, the portions of the shaft on opposite sides of the valve disk or element are in effect displacement members coacting with cylinders.

Connecting one hydraulic cylinder to the other is a hydraulic line or circuit 41 drilled through the valve shaft. Thus, the closed hydraulic fluid circuit does not require a multiplicity of piping, leaving the passageway of the main check valve comparatively free from obstruction.

Within the hydraulic line or circuit portion is a valve means comprising a flow restricting orifice 43 and an auxiliary fluid check valve 44 as a means to differentially control the rate of fluid flow differentially affecting the opening and closing movement of the valve element. The valve means are positioned at one end of the valve shaft 33, and as shown in the drawing, are a continuation of the hydraulic line or circuit 41, forking from said circuit at 42 and extending to the end of the valve shaft. With the combination of the restricting orifice 43 for allowing restricted flow of the fluid in both directions and the auxiliary check valve 44, for allowing free flow of the hydraulic fluid in one direction and preventing flow in the opposite direction, there is provided the means for differentially controlling the rate of fluid flow within the hydraulic line or circuit.

A hydraulic fluid source 46 is connected to the fluid line as indicated in the drawing to replenish any loss of hydraulic fluid due to leakage.

With the valve disk 34 seated against the valve seat 27 and with a pressure drop across the valve disk from the pressure in the valve, the disk 34 will tend to move against the spring 36. During this opening the valve shaft 33 will move farther into the cylinder 38 thus displacing the fluid, such as oil, or water, or whatever is to be used in the line 41. When the fluid in the line thus moves, the auxiliary check valve 44 opens permitting the unretarded flow of the fluid from cylinder 38 to the other cylinder 37, the restricting orifice 43 in this instance not being effective as most of the fluid bypasses through the auxiliary check valve.

Therefore, by allowing the hydraulic fluid in the fluid line 41 to flow unrestricted there may be a rapid movement of the valve disk 34 away from the valve seat 27 permitting the passage of air or gas in the pressure conduit.

When the air or gas pressure within the valve body diminishes below the force of the return spring 36, the valve disk or element 34 will be forced back on the valve seat 27. However, the movement of the valve disk 34 and the valve shaft 33 toward the valve seat 27 is damped, because the fluid must then flow from cylinder 37 to cylinder 38 through the fluid line 41. Movement of the fluid in this direction causes the auxiliary check valve 44 to close against its seat so that fluid flow is only through the restricting orifice 43. This imposes a restrained force against the action of the return spring 36 and gives a positive damping effect on the valve disk 34, eliminating vibration or chattering of the spring and mass system which the main check valve itself comprises.

Thus, as above described, and as shown in the drawing, the improvement of the internal hydraulic circuit means provides a clear passageway within the valve body and therefore allows the fluid in the pressure conduit less restriction in flow.

The fluid source means 46 for the hydraulic system may be of any type, such as a gravity feed pot, or oiler, or a connection from any fluid line which will insure that the hydraulic system will have fluid in it at all times during operation. The fluid source should be arranged so that gravity will eliminate any gas or air in the system so that the closed circuit will at all times contain a non-compressible fluid as a pocket of air will tend to defeat the purpose of the damping system.

Although only one embodiment of the present invention has been illustrated and described it will be apparent to those skilled in the art that various changes and modifications may be made therein without departing from the spirit of the invention or the scope of the appended calims.

What is claimed is:

1. In a valve structure having inlet and outlet passages, said inlet and outlet passages adapted to be connected with a pressure fluid line, a valve seat within said valve structure, a valve disk within said valve structure mounted intermediate the ends of a reciprocal shaft and movable to engage said valve seat, said valve disk having an inlet passage side and an outlet passage side, said valve disk responsive to differential pressures in said inlet and outlet passages of said valve structure to open said valve disk when pressure in said inlet passage is greater than pressure in said outlet passage and to close said valve disk when pressure in said outlet passage is greater than pressure in said inlet passage, biasing means tending to hold said valve disk on said valve seat, first and second cylinders located concentrically within said valve structure on opposite sides of said valve disk and supporting said ends of said reciprocal shaft, hydraulic circuit means coacting with said valve disk in response to the movement of said valve disk, said hydraulic circuit means having opposed hydraulic dashpots defined by each of said shaft ends and its supporting cylinder, sealing means cooperating between said shaft and said cylinders, a hydraulic fluid line extending longitudinally through said shaft connecting said cylinders, and means interposed in said hydraulic fluid line restricting hydraulic fluid flow in one direction and allowing a free flow of the hydraulic fluid in the opposite direction.

2. A valve structure adapted to be connected to a pressure fluid line having inlet and outlet passages, a valve seat within said valve structure, a valve disk mounted intermediate the ends of a reciprocal hydraulic fluid displacement member and movable within said valve structure to engage said valve seat, said valve disk having an inlet passage side and an outlet passage side, said valve disk responsive to differential pressures in said inlet and outlet passages of said valve structure to open said valve disk when pressure in said inlet passage is greater than pressure in said outlet passage and to close said valve disk when pressure in said outlet passage is greater than pressure in said inlet passage, first and second cylinders located concentrically within said valve structure on opposite sides of said valve disk and supporting said ends of said hydraulic fluid displacement member, sealing means cooperating between said cylinders and said hydraulic fluid displacement member, hydraulic circuit means coacting with said valve disk in response to the movement thereof, said hydraulic circuit means comprising a hydraulic fluid circuit and first and second dashpots defined respectively by said ends of said member and said cylinders on the inlet passage side and outlet passage side of said valve disk, said member having a longitudinal fluid line therethrough connecting the respective dashpots, and means differentially controlling the rate of fluid flow in opposite directions through said circuit differentially affecting the opening and closing movement of said valve disk with respect to said seat.

3. In a valve structure comprising a valve body adapted to be connected into a fluid pressure line, said valve body having inlet and outlet passages, a valve seat and a valve disk movable within said valve body to engage said valve seat, said valve disk responsive to differential pressures in said inlet and outlet passages of said valve body to open said valve disk when pressure in said inlet passage is greater than pressure in said outlet passage and to close said valve disk when pressure in said outlet passage is greater than pressure in said inlet passage, two hydraulic cylinders coaxially disposed opposite each other in said valve body, a valve shaft disposed with said hydraulic cylinders on opposite ends thereof, said valve disk fixed upon said valve shaft, biasing means tending to hold said valve disk against said valve seat, sealing means cooperating between said valve shaft and said hydraulic cylinders, a hydraulic fluid line connecting the hydraulic cylinders, said fluid line extending longitudinally through said valve shaft, and valve means interposed in said fluid line comprising a flow restrictive orifice in parallel relationship with a fluid check valve, said fluid check valve having a ball and spring means allowing free flow of the hydraulic fluid in one direction in response to said main valve disk being unseated from said valve seat and preventing flow of said hydraulic fluid in the opposite direction.

References Cited in the file of this patent

UNITED STATES PATENTS

| 1,466,171 | Jacobsen | Aug. 28, 1923 |
| 1,589,640 | Gulick | June 22, 1926 |
| 1,890,311 | Blake | Dec. 6, 1932 |
| 2,625,913 | Baldwin | Jan. 20, 1953 |

FOREIGN PATENTS

| 895,333 | France | Apr. 3, 1944 |